(12) United States Patent
Mani et al.

(10) Patent No.: US 11,449,199 B2
(45) Date of Patent: Sep. 20, 2022

(54) METHOD AND SYSTEM FOR GENERATING DYNAMIC USER INTERFACE LAYOUT FOR AN ELECTRONIC DEVICE

(71) Applicant: SAMSUNG ELECTRONICS CO., LTD., Suwon-si (KR)

(72) Inventors: Parameswaranath Vadackupurath Mani, Bangalore (IN); Mahender Rampelli, Bangalore (IN); Mohamed Akram Ulla Shariff, Bangalore (IN); Shankar Natarajan, Bangalore (IN); Sreevatsa Dwaraka Bhamidipati, Bangalore (IN); Sujay Srinivasa Murthy, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/026,971

(22) Filed: Sep. 21, 2020

(65) Prior Publication Data
US 2021/0089175 A1    Mar. 25, 2021

(30) Foreign Application Priority Data

Sep. 21, 2019    (IN) .............................. 201941038129
Sep. 9, 2020    (IN) .............................. 201941038129
Sep. 21, 2020    (KR) ........................ 10-2020-0121519

(51) Int. Cl.
*G06F 3/0482* (2013.01)
*G06F 3/04845* (2022.01)
(Continued)

(52) U.S. Cl.
CPC ........ *G06F 3/0482* (2013.01); *G06F 3/04845* (2013.01); *G06K 9/623* (2013.01); *G06N 20/00* (2019.01); *G06F 2203/04803* (2013.01)

(58) Field of Classification Search
CPC .. G06F 3/0482; G06F 3/0481; G06F 3/04845; G06F 3/0484; G06F 2203/04803;
(Continued)

(56) References Cited

U.S. PATENT DOCUMENTS 7,609,847 B2    10/2009    Widdowson et al.
8,943,426 B2    1/2015    Lu et al.
(Continued)

FOREIGN PATENT DOCUMENTS

KR    10-1485497 B1    1/2015

OTHER PUBLICATIONS

O'Donovan et al., "Learning Layouts for Single-Page Graphic Designs", IEEE Transactions On Visualization and Computer Graphics, date of publication: Mar. 20, 2014. (Year: 2014).*
(Continued)

*Primary Examiner* — Reza Nabi
*Assistant Examiner* — Hwei-Min Lu
(74) *Attorney, Agent, or Firm* — Sughrue Mion, PLLC

(57) ABSTRACT

The present disclosure relates to a method and a layout generation system for generating dynamic User Interface (UI) layout for an electronic device. The method includes identifying one or more operations related to at least one UI element based on a current state of a display screen of the electronic device, calculating a saliency score and an aesthetic score for each of a plurality of grids determined on the display screen, based on the calculated saliency score and the calculated aesthetic score, identifying a plurality of candidate regions, identifying an optimal region from the plurality of candidate regions based on a user interaction score and generating the dynamic UI layout by performing the one or more operations related to the at least one UI element in the optimal region.

16 Claims, 9 Drawing Sheets

(51) Int. Cl.
*G06K 9/62* (2022.01)
*G06N 20/00* (2019.01)

(58) Field of Classification Search
CPC ...... G06N 20/00; G06K 9/623; G06K 9/6228; G06K 9/6217
USPC ........................................................ 715/764
See application file for complete search history.

(56) References Cited

U.S. PATENT DOCUMENTS

| | | | |
|---|---|---|---|
| 9,219,830 B1* | 12/2015 | Ciorba | H04N 1/00177 |
| 9,959,652 B2 | 5/2018 | Ma et al. | |
| 10,297,037 B2 | 5/2019 | Shin | |
| 2005/0071781 A1* | 3/2005 | Atkins | G06T 11/60 |
| | | | 715/838 |
| 2013/0132874 A1 | 5/2013 | He et al. | |
| 2014/0096037 A1* | 4/2014 | Grosz | G06F 3/1242 |
| | | | 715/753 |
| 2014/0245115 A1* | 8/2014 | Zhang | G06F 40/103 |
| | | | 715/202 |
| 2014/0359656 A1* | 12/2014 | Banica | H04N 21/234 |
| | | | 725/32 |
| 2015/0269160 A1 | 9/2015 | Babaian et al. | |
| 2015/0310124 A1* | 10/2015 | Ben-Aharon | G06F 40/186 |
| | | | 715/205 |
| 2016/0188161 A1* | 6/2016 | Toussaint | G06F 3/04886 |
| | | | 715/765 |
| 2016/0217623 A1 | 7/2016 | Singh | |
| 2018/0150433 A1* | 5/2018 | Sowden | H04N 1/00185 |
| 2018/0276182 A1* | 9/2018 | O'Donovan | G06F 8/34 |
| 2019/0121617 A1* | 4/2019 | Shack | G06F 8/10 |
| 2019/0251707 A1* | 8/2019 | Gupta | G06T 9/002 |
| 2020/0073679 A1 | 3/2020 | Pitchaimani et al. | |
| 2020/0310631 A1* | 10/2020 | Jiang | G06F 3/04817 |
| 2021/0027508 A1* | 1/2021 | Sharma | G06F 40/166 |

OTHER PUBLICATIONS

Santini, "Assigning Rated Items to Locations in Non-List Display Layouts", IEEE Transactions On Visualization and Computer Graphics, date of publication: Sep. 12, 2018. (Year: 2018).*
Zheng et al., "Content-aware Generative Modeling of Graphic Design Layouts", ACM Trans. Graph., vol. 38, No. 4, Article 133. Publication date: Jul. 2019. (Year: 2019).*
Li et al., "Harmonious Textual Layout Generation over Natural Images via Deep Aesthetics Learning", IEEE Transactions on Multimedia, Aug. 29, 2021 (Year: 2021).*
Written Opinion (PCT/ISA/237) issued by the International Searching Authority in corresponding International Application No. PCT/KR2020/012729, dated Jan. 20, 2021.
International Search Report (PCT/ISA/210), issued by International Searching Authority in corresponding International Application No. PCT/KR2020/012729, dated Jan. 20, 2021.
Communication dated Nov. 29, 2021 issued by the Intellectual Property India in application No. 201941038129.

* cited by examiner

METHOD AND SYSTEM FOR GENERATING DYNAMIC USER INTERFACE LAYOUT FOR AN ELECTRONIC DEVICE

CROSS REFERENCE TO RELATED APPLICATION(S)

This application is based on and claims the benefit under 35 USC § 119 to Indian Provisional Application No. 201941038129 filed on Sep. 21, 2019 and Indian Complete Application No. 201941038129 filed on Sep. 9, 2020, and Korean Patent Application No. 10-2020-0121519, filed on Sep. 21, 2020 in the Korean Intellectual Property Office, the contents of which are incorporated herein by reference.

BACKGROUND

1. Field

The present disclosure relates to layout generation and management of User Interfaces (UI) for electronic devices, more particularly, but not exclusively to a method and system for generating dynamic User Interface (UI) layout for an electronic device.

2. Description of Related Art

A Graphical User Interface (GUI) is a system of interactive visual components for computer software. A GUI displays objects that convey information and represent actions that can be taken by a user. The objects change color, size, or visibility when the user interacts with the objects. GUI objects include icons, cursors, and buttons. These graphical elements are sometimes enhanced with sounds, or visual effects like transparency and drop shadows. Generally, user interface elements fall into one of the following four categories, i.e., Input Controls (ICs), Navigation Components (NCs), Informational Components and Containers (ICC).

User Interface (UI) elements can be displayed by a graphical user interface of a computing device and interacted with users of the device. A mobile UI allows a user to interact with applications, features, contents, and functions of the mobile device. In computer applications, a list of user interface (UI) elements accomplishing various functionalities are often shown at the same place, for example, the same window, menu, frame, tab, or pane. Thus, the displays of UI elements are limited in their usefulness to various users.

Currently, the UI layouts are defined statically. Existing systems concentrate on placement of text on image, based on a Region of Interest (ROI). The existing UI layout generation systems do not consider user interaction pattern for optimal compositions for device factors which are very crucial during handling of multiple form factors.

Hence, there is a need to develop user interfaces for each form factor and for managing a UI for foldable devices, where different modes such as, Augmented Reality (AR) mode, Desktop Experience (DEX) etc., can be handled by one system. Therefore, improvements in the display of UI elements would be useful.

The information disclosed in this background of the disclosure section is only for enhancement of understanding of the general background of the inventive concept and should not be taken as an acknowledgement or any form of suggestion that this information forms the prior art already known to a person skilled in the art.

SUMMARY

In an embodiment, the present disclosure may relate to a method for generating dynamic User Interface (UI) layout for an electronic device. The method includes identifying one or more operations related to at least one UI element based on a current state of a display screen of the electronic device, calculating a saliency score and an aesthetic score for each of a plurality of grids determined on the display screen, based on the calculated saliency score and the calculated aesthetic score, identifying a plurality of candidate regions based on a user interaction score, generating the dynamic UI layout by performing the one or more operations related to the at least one UI element in the optimal region.

The one or more operations may comprise displaying the at least one UI element and re-arrangement of at least one UI element on the display screen.

Upon identifying the one or more operations, the display screen may be divided into the plurality of grids based on parameters associated with the at least one UI element.

The parameters associated with the at least one UI element may comprise size, transparency, and interactability with users.

Identifying of the optimal region from the plurality of candidate regions may comprise calculating a composition score based on the saliency score, the aesthetic score, and the user interaction score; and identifying the optimal region based on the composition score.

The saliency score and the aesthetic score for each of a plurality of grids may be calculated based on respective heatmap output of pre-trained machine learning models.

The saliency score may correspond to prominent features in the display screen, the aesthetic score may correspond to a region with ideal placement possibilities and the interaction score may correspond to a region comprising locations with pre-determined accessibility threshold.

The user interaction score may be determined based on pre-determined user behavior of usage of the electronic device.

The method may further comprise receiving at least one of an input from the electronic device and a user input to trigger re-arrangement of the at least one UI element in the electronic device, determining locations of the plurality of candidate regions and of the optimal region, identifying current position of the at least one UI element in relation to the plurality of candidate regions and the optimal region, and moving the at least one UI element away from the plurality of candidate regions.

The method may further comprise identifying the at least one UI element currently being displayed on the electronic device, and the at least one UI element and an image content may be simultaneously displayed on the electronic device; and displaying the at least one UI element on the identified optimal region.

In an embodiment, the present disclosure may relate to a layout generation system for generating dynamic User Interface (UI) layout for an electronic device. The layout generation system may include a processor and a memory communicatively coupled to the processor and storing instructions executable by the processor, and the processor is configured to identify one or more operations related to at least one UI element based on a current state of a display screen of the electronic device, calculate a saliency score and an aesthetic score for each of a plurality of grids determined on the display screen, based on the calculated saliency score and the calculated aesthetic score, identify a plurality of candidate regions, identify an optimal region from the plurality of candidate regions based on a user interaction score, and generate the dynamic UI layout by performing the one or more operations related to the at least one UI element in the optimal region.

The one or more operations may comprise displaying the at least one UI element and re-arrangement of at least one UI element on the display screen.

Upon identifying the one or more operations, the processor may be further configured to divide the display screen into the plurality of grids based on parameters associated with the at least one UI element.

The parameters associated with the at least one UI element may comprise size, transparency, and interactability with users.

The processor may be further configured to identify the optimal region from the plurality of candidate regions by calculating a composition score based on the saliency score, the aesthetic score, and the user interaction score, and identifying the optimal region based on the composition score.

The processor may be further configured to calculate the saliency score and the aesthetic score for each of a plurality of grids based on respective heatmap output of pre-trained machine learning models.

The saliency score may correspond to prominent features in the display screen, the aesthetic score may correspond to a region with ideal placement possibilities and the interaction score may correspond to a region comprising locations with pre-determined accessibility threshold.

The processor may be further configured to determine the user interaction score based on pre-determined user behavior of usage of the electronic device.

The processor may be further configured to receive at least one of an input from the electronic device and a user input to trigger re-arrangement of the at least one UI element in the electronic device, determine locations of the plurality of candidate regions and of the optimal region, identify current position of the at least one UI element in relation to the plurality of candidate regions and the optimal region; and move the at least one UI element away from the plurality of candidate regions.

The processor may be further configured to identify the at least one UI element currently being displayed on the electronic device, and the at least one UI element and an image content may be simultaneously displayed on the electronic device, and display the at least one UI element on the identified optimal region.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1:
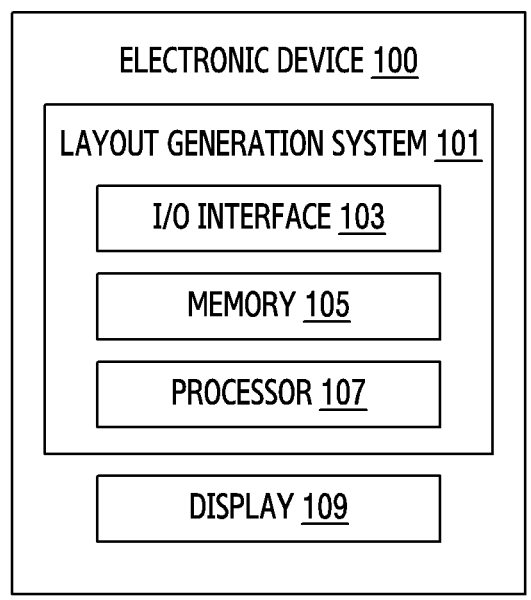
FIG. 1 illustrates an exemplary block diagram of an electronic device for generating dynamic User Interface (UI) layout in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Embodiments of the present disclosure relate to a method and a system for generating dynamic User Interface (UI) layout for an electronic device. Generally, a layout defines a structure for a user interface in any electronic device and allows a user to interact with the electronic device.

Currently, the UI layouts are defined statically. Particularly, existing systems concentrate on placement of text on image, based on a Region of Interest (ROI) without considering user interaction pattern for optimal compositions for device factors which are crucial during handling of multiple types of devices. The present disclosure in such condition focuses on identifying an optimal region from a plurality of candidate regions for layout composition based on user interaction pattern. The plurality of candidate regions are identified based on a saliency score and an aesthetic score, which are calculated based on a current display screen of the electronic device. The present disclosure generates a dynamic UI layout in order to perform operations related to the at least one UI element in the optimal region. As a result, the present disclosure helps in building visually pleasing intuitive UI based on saliency, aesthetics, and user interaction grid, which enhances the readability on the electronic device.

FIG. 1 illustrates an exemplary block diagram of an electronic device for generating dynamic User Interface (UI) layout in accordance with some embodiments of the present disclosure.

Specifically, FIG. 1 illustrates an electronic device 100 comprising a layout generation system 101. In an embodiment, the electronic device 100 referred herein may be any computing device associated with users. For example, a laptop, a notebook, a smartphone, a wearable device, a tablet, and any other computing devices. A person skilled in the art would understand that the scope of the present disclosure may encompass any other electronic device 100, not mentioned herein explicitly, which includes UI layout for interaction with a user. The electronic device 100 includes a display 109 (interchangeable referred as display screen) apart from other components, which are not shown specifically in FIG. 1. The layout generation system 101 includes an Input/Output (I/O) interface 103, a processor 107 and a memory 105 for storing instructions executable by the processor 107. The I/O interface 103 is coupled with the processor 107 through which an input signal and/or an output signal is communicated.

In an embodiment, the user may communicate and interact with the electronic device 100 using various UI elements present in the UI of the electronic device 100. Typically, placement of one or more UI elements is based on various factors including a specific type of the display screen 109 of the electronic device 100, for instance, home screen, lock screen, applications screen, and the like. The layout generation system 101 may be used in the electronic device 100 for generating dynamic UI layout in the electronic device 100. In an embodiment, the layout generation system 101 may be a computing unit configured within the electronic device 100.

At any given instant, when the electronic device 100 is being used by the user, the layout generation system 101 may determine a current state of the display screen 109 of the electronic device 100, that is, what state the display screen 109 is in currently, and which UI elements are associated with the current state. In an embodiment, the UI elements are interactive components for providing interactivity to user interface. For instance, the least one UI element may include icons, notifications, widgets, navigation components, input controls and the like. The current state of the display screen 109 may be, for example, one of the lock screen, home screen, middle part of an application page and the like. Additionally, a frame associated with the display screen 109 is determined based on the current state of the display screen 109.

Based on the determined current state of the display screen 109, the layout generation system 101 identifies one or more operations related to at least one UI element. The one or more operations may include displaying the at least one UI element, re-arrangement of at least one UI element on the display screen 109 and the like.

Further, the display screen 109 of the electronic device 100 is divided to form a plurality of grids based on parameters associated with the at least one UI element. The parameters associated with the at least one UI element may include size, transparency, and interactability with users. For each of the plurality of grids, the layout generation system 101 calculates a saliency score which corresponds to prominent features in the display screen 109 and an aesthetic score corresponding to a region with ideal placement possibilities on the display screen 109. The layout generation system 101 utilizes pre-trained machine learning models for calculating the saliency score and the aesthetic score for each of the plurality of grids.

In some embodiments, the layout generation system 101 identifies a plurality of candidate regions based on the calculated saliency score and the aesthetic score. The plurality of candidate regions are utilized in performing the one or more operations related to the one or more UI element. Amongst the plurality of candidate regions, the layout generation system 101 identifies an optimal region based on a user interaction score. In an embodiment, the optimal region may refer to a region in the display screen 109 which is suitable for performing the one or more operations related to the at least one UI element. The user interaction score corresponds to a region comprising locations with pre-determined accessibility threshold and is determined based on pre-determined user behavior related to usage of the electronic device 100. The user interaction score may be determined using a machine learning model, which may be trained with predetermined user behavior related to usage of the electronic device 100.

Particularly, the layout generation system 101 calculates a composition score based on the saliency score, the aesthetic score and the user interaction score and identifies the optimal region based on the composition score. Thereafter, the layout generation system 101 generates the dynamic UI layout by performing the one or more operations related to the at least one UI element in the optimal region. Thus, the present subject matter makes use of user interaction pattern for optimal layout compositions. For instance, consider if the one or more operation is for re-arrangement of the at least one UI element in the electronic device 100. The layout generation system 101 may receive an input either from the electronic device 100 or from the user explicitly to trigger re-arrangement of the at least one UI element in the electronic device 100. In such case, the layout generation system 101 may determine locations of the plurality of candidate regions and of the optimal region and identify current position of the at least one UI element in relation to the plurality of candidate regions and the optimal region. There-upon causing the at least one UI element to move away from the one or more candidate regions. Alternatively, consider if the one or more operation is displaying the at least one UI element in the electronic device 100. The layout generation system 101 may identify the at least one UI element currently being displayed on the electronic device 100. Consider if the least one UI element and an image content are being simultaneously displayed on the electronic device 100. In such case, the layout generation system 101 may cause the at least one UI element to be displayed on the identified optimal region.

Figure 2:
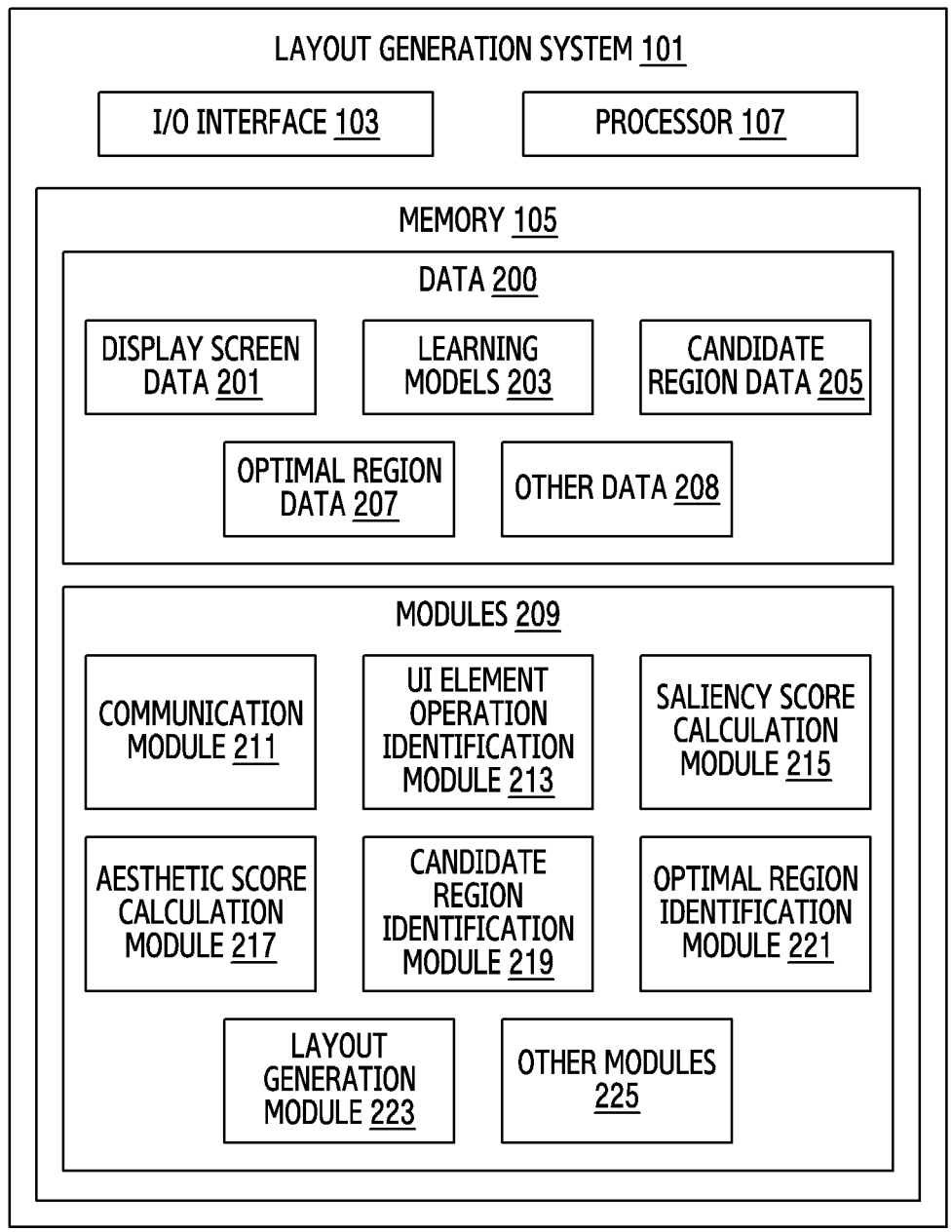
FIG. 2 shows a detailed block diagram of a layout generation system in accordance with some embodiments of the present disclosure.

FIG. 2 shows a detailed block diagram of a layout generation system in accordance with some embodiments of the present disclosure.

The layout generation system 101 may include data 200 and one or more modules 209 which are described herein in detail. In an embodiment, data 200 may be stored within the memory 105. The data 200 may include, for example, display screen data 201, learning models 203, candidate region data 205, optimal region data 207 and other data 208.

The display screen data 201 may include information about the current state of the display screen 109 on the electronic device 100. The state of the display screen 109 may be lock screen, home screen, application page and the like. Further, the display screen data 201 may include frame details based on the current state of the display screen 109. Further, the display screen data 201 may include information about the at least one UI element associated with the current state of the display screen 109.

The learning models 203 may include a saliency score machine learning model and an aesthetic score machine learning model for providing respective scores for the plurality of grids.

The candidate region data 205 may include information about the plurality of candidate regions which are identified from the plurality of grids for the display screen 109 based on the saliency score and the aesthetic score. For instance, the information may include pixel or location details for such plurality of candidate regions.

The optimal region data 207 may include information about the region which is identified as optimal among the plurality of candidate regions. The information may include, for instance, pixel or location associated with the optimal region.

The other data 208 may store data, including temporary data and temporary files, generated by modules 209 for performing the various functions of the layout generation system 101.

In an embodiment, the data 200 in the memory 105 are processed by the one or more modules 209 present within the memory 105 of the layout generation system 101. In an embodiment, the one or more modules 209 may be implemented as dedicated units. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. In some implementations, the one or more modules 209 may be communicatively coupled to the processor 107 for performing one or more functions of the layout generation system 101. The modules 209 when configured with the functionality defined in the present disclosure will result in a novel hardware.

In one implementation, the one or more modules 209 may include, but are not limited to a communication module 211, a UI element operation identification module 213, a saliency score calculation module 215, an aesthetic score calculation module 217, a candidate region identification module 219, an optimal region identification module 221 and a layout generation module 223. The one or more modules 209 may also include other modules 225 to perform various miscellaneous functionalities of the layout generation system 101. In an embodiment, the other modules 225 may include a display screen determination module and a training module. The display screen determination module determines the current state of the display screen 109 on the electronic device 100. The training module may train the machine learning models for calculating the saliency score, the aesthetic score, and the user interaction score.

The communication module 211 may obtain one or more implicit inputs from the electronic device 100 and from the user of the electronic device 100.

The UI element operation identification module 213 may identify the one or more operations related to at least one UI element based on the current state of the display screen 109. In an embodiment, the one or more operations may include displaying the at least one UI element and re-arrangement of at least one UI element on the display screen 109. In case of re-arrangement request, the at least one UI element may be caused to move away from the optimal region.

Figure 3A:
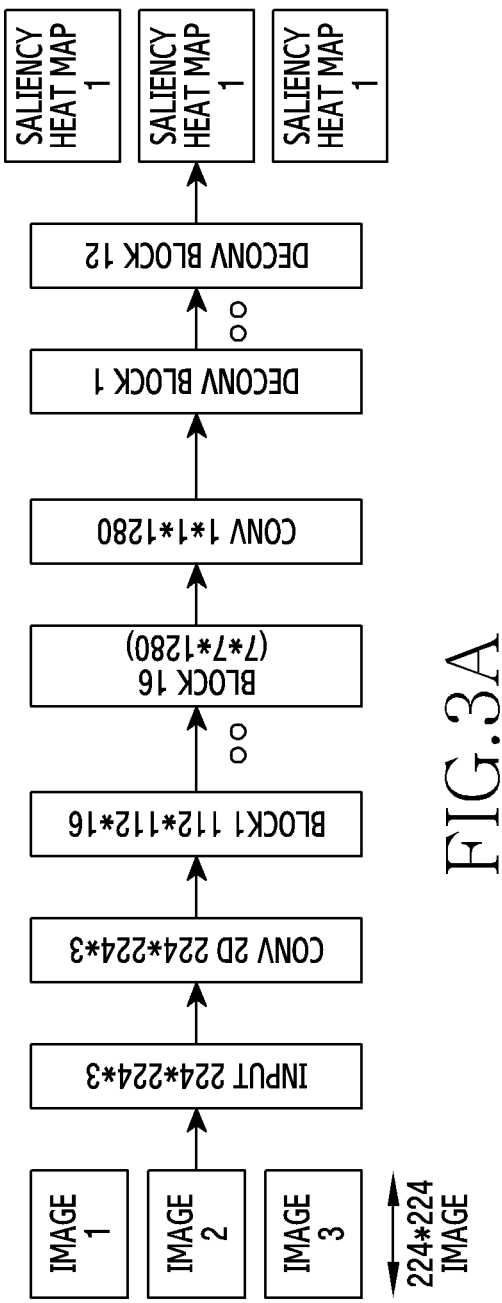
FIGS. 3A-3B show exemplary machine learning models for generating saliency score and aesthetic score respectively in accordance with some embodiments of the present disclosure.

The saliency score calculation module 215 may calculate the saliency score for each of the plurality of grids determined on the display screen 109, by using the pretrained machine learning model. The saliency score for each of the plurality of grids is calculated based on heatmap output of the saliency score machine learning model. Particularly, the heatmap output is used to identify a region of feature density scoring respective cells. FIG. 3A shows an exemplary representation for machine learning model for generating saliency heatmap in accordance with some embodiments of the present disclosure. As shown, FIG. 3A shows exemplary three images, features of which are fed as input to the saliency score machine learning model. In an embodiment, the saliency score machine learning model may be trained using deep learning mechanism. As shown in FIG. 3A for instance, the saliency score machine learning model includes different Convolutional and De-Convolutional blocks for calculating the saliency heatmap value, where the heatmap value for each grid cell of the image is the saliency score.

Figure 3B:
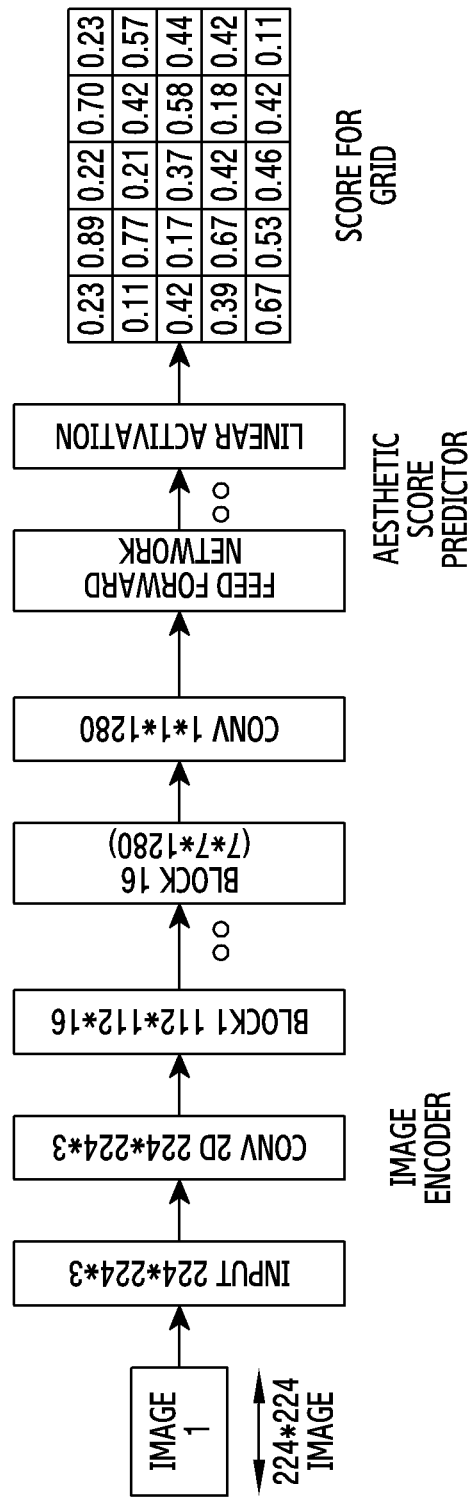

The aesthetic score calculation module 217 may calculate the aesthetic score for each of the plurality of grids determined on the display screen 109 by using the pretrained machine learning model. Particularly, the aesthetic score corresponds to a region with ideal placement possibilities. The aesthetic score for each of a plurality of grids is calculated based on heatmap output of the aesthetic score machine learning model. Particularly, the heatmap output is used to identify ideal placement possibilities aesthetically. FIG. 3B shows an exemplary representation for machine learning model for generating an aesthetic score in accordance with some embodiments of the present disclosure. As shown, FIG. 3B shows an exemplary image, features of which are fed as input to the aesthetic score machine learning model. In an embodiment, the aesthetic score machine learning model may be trained using deep learning mechanism. As shown in FIG. 3B, for instance, the aesthetic score machine learning model includes different Convolutional and De-Convolutional blocks for calculating the aesthetic score.

Figure 4A:
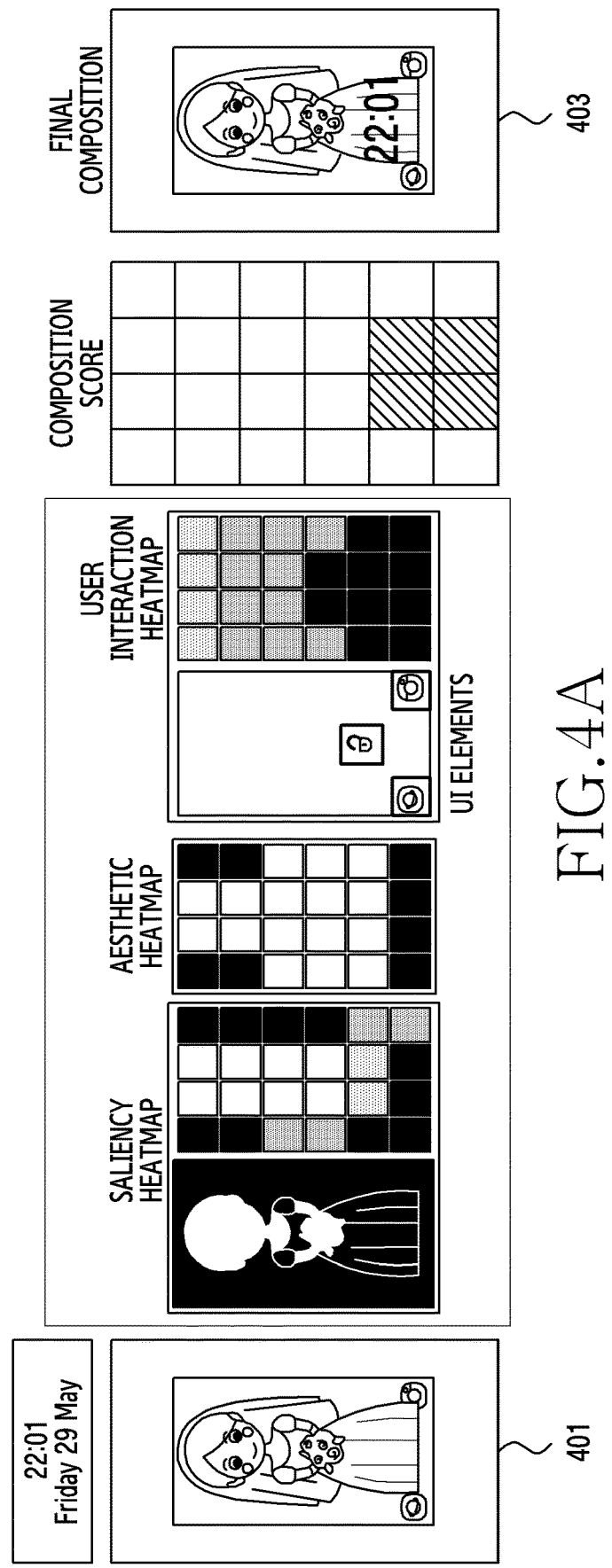
FIG. 4A shows an exemplary representation for generating dynamic User Interface (UI) layout in accordance with some embodiments of the present disclosure.

The candidate region identification module 219 may identify the plurality of candidate regions based on the calculated saliency score and the calculated aesthetic score. FIG. 4A as described below in detail shows how the saliency score, the aesthetic score and the user interaction scores are combined to calculate the composition score. In an embodiment, pre-learned weights may be used for summation of these three scores as weighted summation ($CS_{ij}$). Thus, grid cells with maximum scores are considered for candidate regions.

Figure 3C:
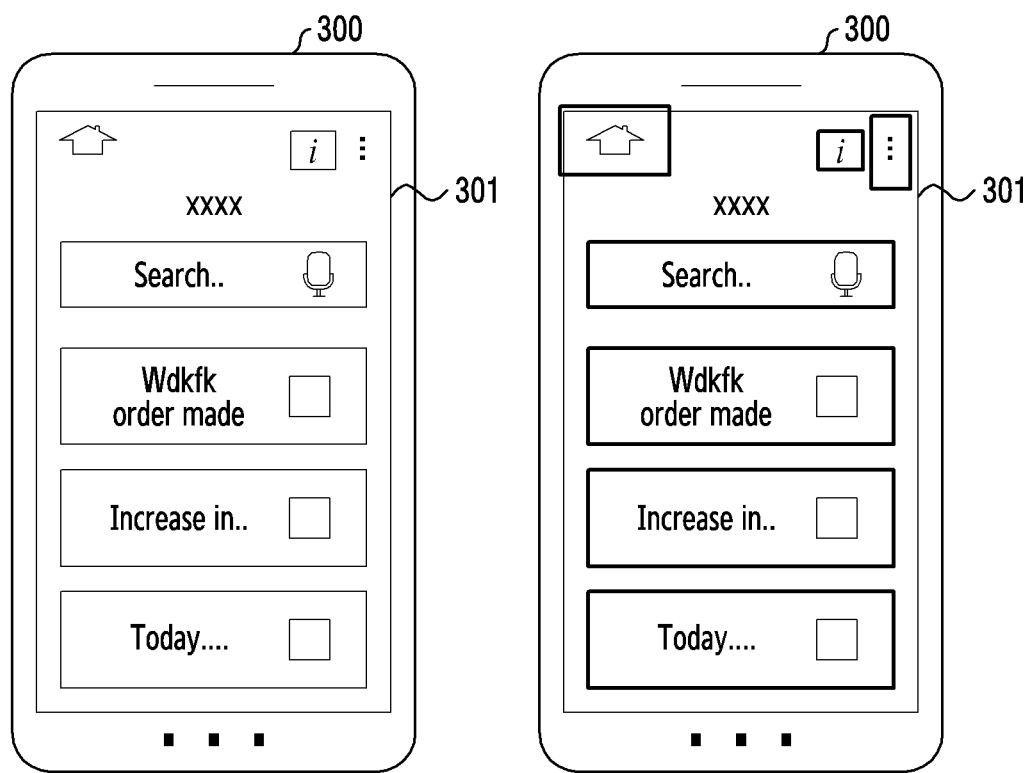
FIG. 3C shows an exemplary embodiment for generating user interaction score in accordance with some embodiments of the present disclosure.

The optimal region identification module 221 may identify the optimal region for the dynamic UI layout from the plurality of candidate regions. Particularly, the optimal region identification module 221 identifies the optimal region based on the user interaction score. The optimal region identification module 221 may determine the user interaction score for the display screen 109 based on pre-determined user behavior of usage of the electronic device 100. In an embodiment, the optimal region identification module 221 may determine the user interaction score by using an interaction score machine learning model, particularly based on heatmap output from the machine learning model. The interaction score machine learning model may be trained previously using plurality of user interaction behavior associated with usage of the electronic device 100. The interaction score machine learning model may be trained for pre-determined accessibility threshold, such as, highly interactable region, medium and low interactable region. Thus, the interaction score corresponds to region comprising locations with pre-determined accessibility threshold. FIG. 3C shows an exemplary embodiment for generating a user interaction score in accordance with some embodiments of the present disclosure. FIG. 3C shows a mobile device 300 with a display screen 301 of a website page, which includes one or more UI elements. Based on the user interaction behavior associated with usage of the electronic device 100, i.e., how often the one or more UI elements are utilized by the user, the optimal region identification module 221 may determine a frequency map for the grids of the display screen 301 based on user interaction behavior in order to determine the user interaction score for the display screen 301. The user interaction region which are highly utilized by the user is shown as highlighted in the display screen 301.

Thus, upon determining the user interaction score, the optimal region identification module 221 calculates the composition score, which is a weighted average based on the saliency score, the aesthetic score, and the user interaction score. The optimal region identification module 221 identifies the optimal region based on the composition score.

The layout generation module 223 may generate the dynamic UI layout by performing the one or more operations related to the at least one UI element in the optimal region.

FIG. 4A shows an exemplary representation for generating dynamic User Interface (UI) layout in accordance with some embodiments of the present disclosure.

Figure 4B:
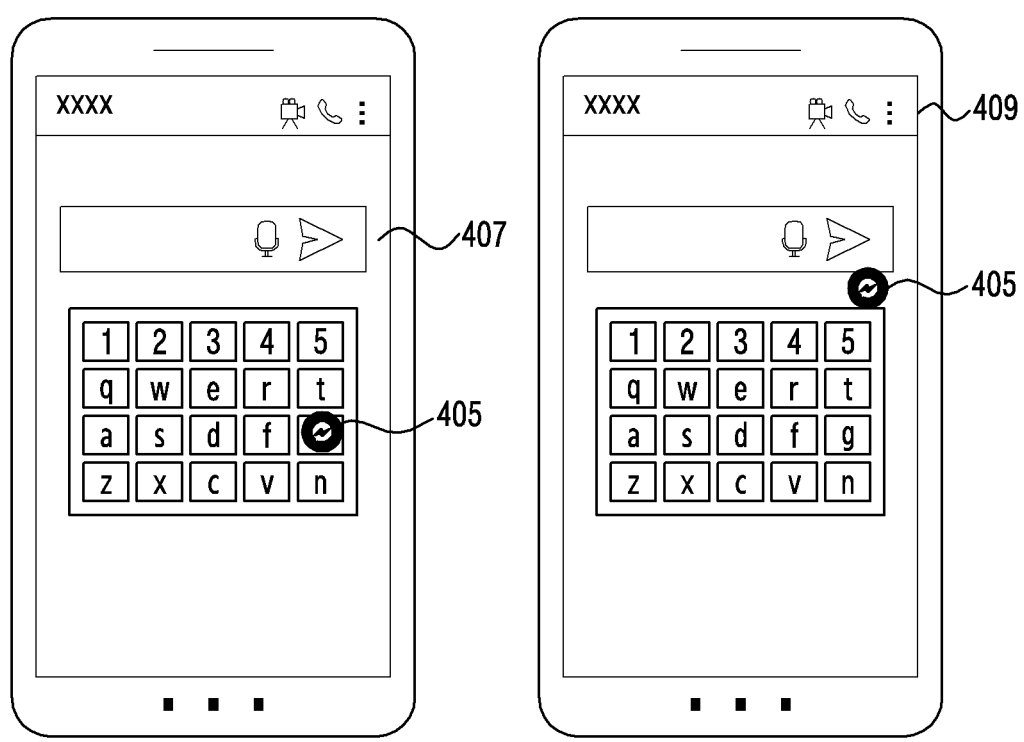
FIG. 4B shows an exemplary UI layout generation in accordance with some embodiments of the present disclosure.

FIG. 4A shows an exemplary embodiment for generating dynamic User Interface (UI) layout. As shown, the embodiment includes a current lock screen 401 of the electronic device 100. The lock screen 401 includes a background image and an application layout such that date and time are placed above the background image. In case the layout generation system 101 receives a re-arrangement request from the user from placement of the application layout, i.e. date and the time within the background image, the layout generation system 101 may dynamically generate the requested UI layout by identifying an optimal region based on the composition score using the saliency score, the aesthetic score and the user interaction score. Thus, accordingly, the layout generation system 101 provides the dynamic UI layout with the placement of application layout in the background image as shown by final composition screen 403. Similarly, considering another scenario, where the UI element may be a layout within an application window or window of other application. For instance, notification bubbles from applications may be rearranged according to an optimal region for background application. In addition, dynamic layout may be generated based on bubble placement as shown in FIG. 4B. FIG. 4B shows an exemplary UI layout generation in accordance with some embodiments of the present disclosure. As shown in FIG. 4B, a mobile device with display screen 407 includes keypad along with a touch assistive icon 405. The touch assistive icon 405 as seen is placed on one of the alphabetic element, thus causing interactive issues to the user. In such case, based on the saliency score, the aesthetic score and the user interaction score, the layout generation system 101 may determine the optimal region and performs re-arrangement of the touch assistive icon 405 without obscuring other touchable elements. The display screen 407 with dynamic layout generation is represented as a display screen 409 with re-arrangement of the touch assistive icon 405 away from the touch alphabetic element.

In an embodiment, the present disclosure may also be applicable for other use cases, such as, when a state of the electronic device 100 changes in foldable devices.

Figure 5:
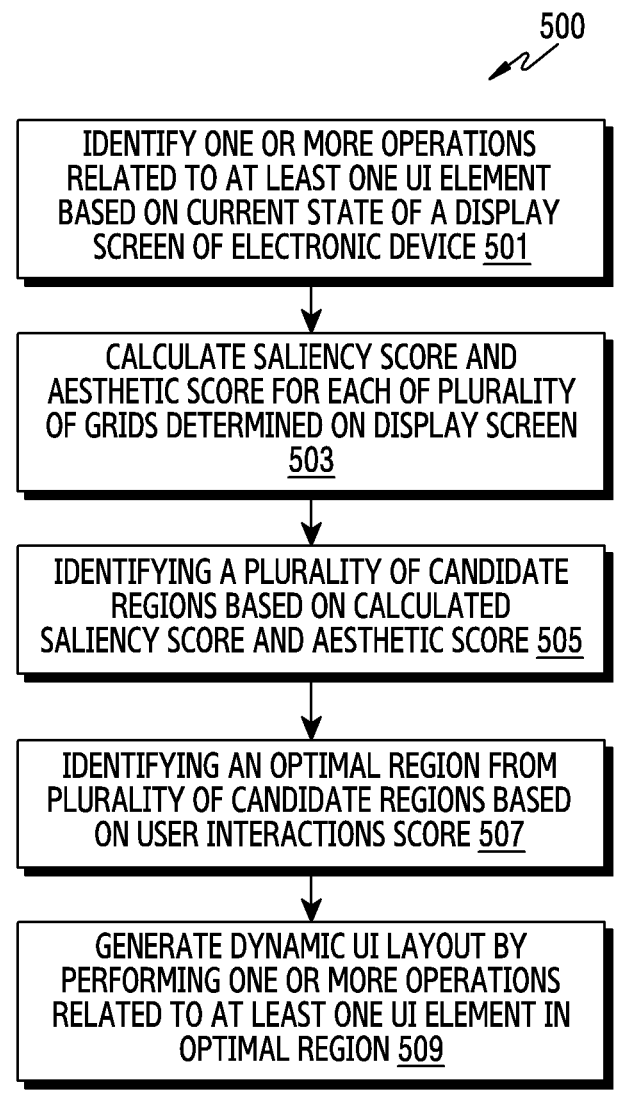
FIG. 5 illustrates a flowchart showing a method for generating dynamic User Interface (UI) layout in accordance with some embodiments of present disclosure.

FIG. 5 illustrates a flowchart showing a method for generating dynamic User Interface (UI) layout in accordance with some embodiments of present disclosure.

As illustrated in FIG. 5, the method 500 includes one or more blocks for generating dynamic User Interface (UI) layout. The method 500 may be described in the general context of computer executable instructions. Generally, computer executable instructions can include routines, programs, objects, components, data structures, procedures, modules, and functions, which perform particular functions or implement particular abstract data types.

The order in which the method 500 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 501, the one or more operations related to the at least one UI element is identified by the UI element operation identification module 213 based on the current state of the display screen 109 of the electronic device 100. The one or more operations includes displaying the at least one UI element and re-arrangement of the at least one UI element on the display screen 109.

At block 503, the saliency score and the aesthetic score are calculated by the saliency score calculation module 215 and the aesthetic score calculation module 217, respectively for each of the plurality of grids determined on the display screen 109.

At block 505, the plurality of candidate regions are identified by the candidate region identification module 219 based on the calculated saliency score and the calculated aesthetic score.

At block 507, the optimal region from the plurality of candidate regions is identified by the optimal region identification module 221 based on the user interaction score. The user interaction score is determined based on the pre-determined user behavior of usage of the electronic device 100.

At block 509, the dynamic UI layout is generated by the layout generation module 223 by performing the one or more operations related to the at least one UI element in the optimal region.

Figure 6:
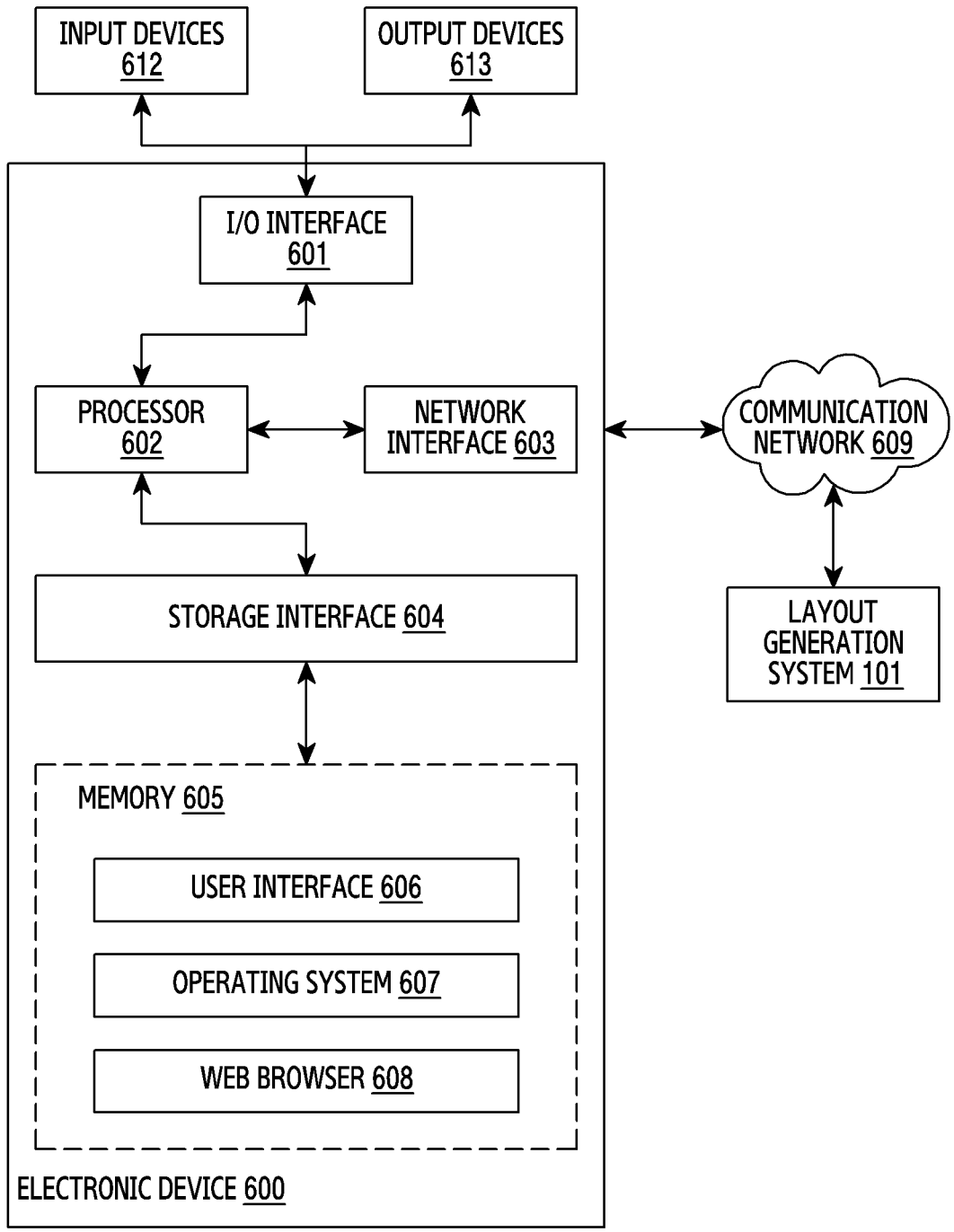
FIG. 6 illustrates a block diagram of an exemplary electronic device for implementing embodiments consistent with the present disclosure.

FIG. 6 illustrates a block diagram of an exemplary electronic device 600 for implementing embodiments consistent with the present disclosure. The electronic device 600 may include a central processing unit ("CPU" or "processor") 602. The processor 602 may include at least one data processor for generating dynamic User Interface (UI) layout for the electronic device 600. The processor 602 may include specialized processing units such as, integrated system (bus) controllers, memory management control units, floating point units, graphics processing units, digital signal processing units, etc.

The processor 602 may be disposed in communication with one or more input/output (I/O) devices (not shown) via I/O interface 601. The I/O interface 601 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 601, the electronic device 600 may communicate with one or more I/O devices 612, 613. For example, the input device may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

The processor 602 may be disposed in communication with the communication network 609 via a network interface 603. The network interface 603 may communicate with the communication network 609. The network interface 603 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 609 may include, without limitation, a direct interconnection, local area network (LAN), wide area network (WAN), wireless network (e.g., using Wireless Application Protocol), the Internet, etc. Using the network interface 603 and the communication network 609, the electronic device 600 may communicate with layout generation system 101. The network interface 603 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 609 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 602 may be disposed in communication with a memory 605 (e.g., RAM, ROM, etc. not shown in FIG. 6) via a storage interface 604. The storage interface 604 may connect to memory 605 including, without limitation, memory drives, removable disc drives, etc., employing connection protocols such as, serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 605 may store a collection of program or database components, including, without limitation, a user interface 606, an operating system 607 etc. In some embodiments, the electronic device 600 may store user/application data, such as, the data, variables, records, etc., as described in this disclosure. Such databases may be implemented as fault-tolerant, relational, scalable, secure databases such as Oracle or Sybase.

The operating system 607 may facilitate resource management and operation of the electronic device 600. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like.

In some embodiments, the electronic device 600 may implement a web browser 608 stored program component. The web browser 608 may be a hypertext viewing application, for example MICROSOFT® INTERNET EXPLORER™, GOOGLE® CHROME™, MOZILLA® FIREFOX™, APPLE® SAFARI™, etc. Secure web browsing may be provided using Secure Hypertext Transport Protocol (HTTPS), Secure Sockets Layer (SSL), Transport Layer Security (TLS), etc. Web browser 608 may utilize facilities such as AJAX™, DHTML™, ADOBE® FLASH™, JAVASCRIPT™, JAVA™, Application Programming Interfaces (APIs), etc. In some embodiments, the electronic device 600 may implement a mail server stored program component. The mail server may be an Internet mail server such as Microsoft Exchange, or the like. The mail server may utilize facilities such as ASP™, ACTIVEX™, ANSI™ C++/C#, MICROSOFT®, NET™, CGI SCRIPTS™, JAVA™, JAVASCRIPT™, PERL™, PHP™, PYTHON™, WEBOBJECTS™, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the electronic device 600 may implement a mail client stored program component. The mail client may be a mail viewing application, such as APPLE® MAIL™, MICROSOFT®

ENTOURAGE™, MICROSOFT® OUTLOOK™, MOZILLA® THUNDERBIRD™, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

The present disclosure generates a dynamic UI layout in order to perform operations related to the at least one UI element in the optimal region. As a result, the present disclosure helps in building visually pleasing intuitive UI based on saliency, aesthetics, and user interaction grid, which enhances the readability on the electronic device 100. Also, the present disclosure facilitates in optimal space utilization of user interface screen for displaying the UI elements at suitable location resulting in enhanced user convenience.

An embodiment of the present disclosure reduces time required by the user for identifying suitable UI elements on the screen and using such UI elements for performing the operations.

An embodiment of the present disclosure helps in eliminating overlaps by using user interaction elements, thus avoiding placement of floating overlays over more frequently used UI elements.

According to an embodiment, a method for generating dynamic User Interface (UI) layout for an electronic device 100, the method comprises identifying, by a layout generation system 101, one or more operations related to at least one UI element based on a current state of a display screen 109 of the electronic device 100, calculating, by the layout generation system 101, a saliency score, and an aesthetic score for each of a plurality of grids determined on the display screen 109, identifying, by the layout generation system 101, a plurality of candidate regions based on the calculated saliency score and the calculated aesthetic score, identifying, by the layout generation system 101, an optimal region from the plurality of candidate regions based on a user interaction score, generating, by the layout generation system 101, the dynamic UI layout by performing the one or more operations related to the at least one UI element in the optimal region.

In some embodiments, the one or more operations comprise displaying the at least one UI element and re-arrangement of at least one UI element on the display screen 109.

In some embodiments, the at least one UI element comprises icons, notifications, widgets, navigation components and input controls.

In some embodiments, the identifying the one or more operations, the display screen is divided into the plurality of grids based on parameters associated with the at least one UI element.

In some embodiments, the parameters associated with the at least one UI element comprises size, transparency, and interactability with users.

In some embodiments, the identifying the optimal region from the plurality of candidate regions comprises, calculating a composition score based on the saliency score, the aesthetic score, and the user interaction score, identifying the optimal region based on the composition score.

In some embodiments, the saliency score and aesthetic score for each of a plurality of grids is calculated based on respective heatmap output of pre-trained machine learning models.

In some embodiments, the saliency score corresponds to prominent features in the display screen 109, the aesthetic score corresponds to a region with ideal placement possibilities and the interaction score corresponds to a region comprising locations with pre-determined accessibility threshold.

In some embodiments, the user interaction score is determined based on pre-determined user behavior of usage of the electronic device 100.

In some embodiments, the method further comprises receiving at least one of an input from the electronic device 100 and a user input to trigger re-arrangement of the at least one UI element in the electronic device 100, determining locations of the plurality of candidate regions and of the optimal region, identifying current position of the at least one UI element in relation to the plurality of candidate regions and the optimal region, causing the at least one UI element to move away from the one or more candidate regions.

In some embodiments, the method further comprises identifying the at least one UI element currently being displayed on the electronic device 100, wherein the at least one UI element and an image content are being simultaneously displayed on the electronic device 100, causing to display, the at least one UI element on the identified optimal region.

According to an embodiment, a layout generation system 101 for generating dynamic User Interface (UI) layout for an electronic device 100, the electronic device 100 comprises a processor 107, a memory 105 communicatively coupled to the processor 107, wherein the memory 105 stores processor instructions, which, on execution, causes the processor 107 to identify one or more operations related to at least one UI element based on a current state of a display screen of the electronic device, calculate a saliency score and an aesthetic score for each of a plurality of grids determined on the display screen 109, identify a plurality of candidate regions based on the calculated saliency score and the calculated aesthetic score, identify an optimal region from the plurality of candidate regions based on a user interaction score, generate the dynamic UI layout by performing the one or more operations related to the at least one UI element in the optimal region.

In some embodiments, the one or more operations comprise displaying the at least one UI element and re-arrangement of at least one UI element on the display screen 109.

In some embodiments, the at least one UI element comprises icons, notifications, widgets, navigation components and input controls.

In some embodiments, the identifying the one or more operations, the processor 107 divides the display screen 109 into the plurality of grids based on parameters associated with the at least one UI element.

In some embodiments, the parameters associated with the at least one UI element comprises size, transparency, and interactable with users.

In some embodiments, the processor 107 identifies the optimal region from the plurality of candidate regions by calculating a composition score based on the saliency score, the aesthetic score, and the user interaction score, identifying the optimal region based on the composition score.

In some embodiments, the processor 107 calculates the saliency score and aesthetic score for each of a plurality of grids based on respective heatmap output of pre-trained machine learning models.

In some embodiments, the saliency score corresponds to prominent features in the display screen 107, the aesthetic score corresponds to a region with ideal placement possibilities and the interaction score corresponds to a region comprising locations with pre-determined accessibility threshold.

In some embodiments, the processor 107 determines the user interaction score based on pre-determined user behavior of usage of the electronic device 100.

In some embodiments, the processor 107 is further configured to receives at least one of, an input from the electronic device 100 and a user input to trigger re-arrangement of the at least one UI element in the electronic device 100, determines locations of the plurality of candidate regions and of the optimal region, identifies current position of the at least one UI element in relation to the plurality of candidate regions and the optimal region, causes the at least one UI element to move away from the one or more candidate regions.

In some embodiments, the processor 107 is further configured to identifies the at least one UI element currently being displayed on the electronic device 100, wherein the at least one UI element and an image content are being simultaneously displayed on the electronic device 100, causes to display, the at least one UI element on the identified optimal region.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media include all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as, an optical fiber, copper wire, etc. The transmission signals in which the code or logic is encoded may further include a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" includes non-transitory computer readable medium, hardware logic, and/or transmission signals in which code may be implemented. A device in which the code implementing the described embodiments of operations is encoded may include a computer readable medium or hardware logic. Of course, those skilled in the art will recognize that many modifications may be made to this configuration without departing from the scope of the invention, and that the article of manufacture may include suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the inventive concept.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 5 show certain events occurring in a certain order. In alternative embodiments, certain operations may be performed in a different order, modified, or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the inventive concept be limited not by this detailed description, but rather by any claims that issue on an application based here on. Accordingly, the disclosure of the embodiments of the inventive concept is intended to be illustrative, but not limiting, of the scope of the inventive concept, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for generating dynamic User Interface (UI) layout for an electronic device, the method comprising:
identifying, by a layout generation system, one or more operations related to at least one UI element on a display screen of the electronic device based on a current state of the display screen of the electronic device, the display screen of the electronic device including a lock screen of the electronic device;
calculating, by the layout generation system, a saliency score for each of a plurality of grids on the display screen based on a saliency score machine learning model trained by using a deep learning mechanism and calculating, by the layout generation system, an aesthetic score for each of the plurality of grids on the display screen based on an aesthetic score machine learning model trained by using the deep learning mechanism;
identifying, by the layout generation system, a plurality of candidate regions on the display screen based on the calculated saliency score and the calculated aesthetic score;
identifying, by the layout generation system, an optimal region for the at least one UI element from the plurality of candidate regions on the display screen based on a user interaction score for the display screen;
generating, by the layout generation system, the dynamic UI layout by performing the one or more operations related to the at least one UI element in the optimal region; and
applying, by the layout generation system, the dynamic UI layout to the display screen of the electronic device including the lock screen of the electronic device,
wherein the identifying of the optimal region from the plurality of candidate regions comprises:
calculating a composition score based on the saliency score for each of the plurality of grids on the display screen, the aesthetic score for each of the plurality of grids on the display screen, and the user interaction score for the display screen, the composition score being a weighted average of the saliency score, the aesthetic score, and the user interaction score; and
identifying the optimal region based on the composition score,
wherein the display screen displays the at least one UI element and a background image, and the at least one UI element includes a UI element of an application on the display screen, and
wherein the one or more operations include re-arrangement of the at least one UI element in relation to the background image on the display screen.

2. The method as claimed in claim 1, wherein upon identifying the one or more operations, the display screen is divided into the plurality of grids based on parameters associated with the at least one UI element.

3. The method as claimed in claim 2, wherein the parameters associated with the at least one UI element comprise size, transparency, and interactability with users.

4. The method as claimed in claim 1, wherein the saliency score for each of the plurality of grids on the display screen and the aesthetic score for each of the plurality of grids on the display screen are calculated based on respective heatmap output of pre-trained machine learning models.

5. The method as claimed in claim 1, wherein the saliency score corresponds to prominent features in the display screen, the aesthetic score corresponds to a region with ideal placement possibilities and the user interaction score corresponds to a region comprising locations with pre-determined accessibility threshold.

6. The method as claimed in claim 1, wherein the user interaction score is determined based on pre-determined user behavior of usage of the electronic device.

7. The method as claimed in claim 1, further comprising:
receiving at least one of an input from the electronic device and a user input to trigger the re-arrangement of the at least one UI element in the electronic device;
determining locations of the plurality of candidate regions and of the optimal region;
identifying current position of the at least one UI element in relation to the plurality of candidate regions and the optimal region; and
moving the at least one UI element away from the plurality of candidate regions.

8. The method as claimed in claim 1, further comprising:
identifying the at least one UI element currently being displayed on the electronic device, wherein the at least one UI element and an image content are simultaneously displayed on the electronic device; and
displaying the at least one UI element on the identified optimal region.

9. A layout generation system for generating dynamic User Interface (UI) layout for an electronic device, comprising:
a processor; and
a memory communicatively coupled to the processor and storing instructions executable by the processor,
wherein the processor is configured to:
identify one or more operations related to at least one UI element on a display screen of the electronic device based on a current state of the display screen of the electronic device, the display screen of the electronic device including a lock screen of the electronic device;
calculate a saliency score for each of a plurality of grids on the display screen based on a saliency score machine learning model trained by using a deep learning mechanism and calculate an aesthetic score for each of the plurality of grids on the display screen based on an aesthetic score machine learning model trained by using the deep learning mechanism;
identify a plurality of candidate regions on the display screen based on the calculated saliency score and the calculated aesthetic score;
identify an optimal region for the at least one UI element from the plurality of candidate regions on the display screen based on a user interaction score for the display screen;
generate the dynamic UI layout by performing the one or more operations related to the at least one UI element in the optimal region;
apply the dynamic UI layout to the display screen of the electronic device including the lock screen of the electronic device,
wherein the processor is further configured to: calculate a composition score based on the saliency score for each of the plurality of grids on the display screen, the aesthetic score for each of the plurality of grids on the display screen, and the user interaction score for the display screen, the composition score being a weighted average of the saliency score, the aesthetic score, and the user interaction score; and identify the optimal region based on the composition score, wherein the display screen displays the at least one UI element and a background image, and the at least one UI element includes a UI element of an application on the display screen, and wherein the one or more operations include re-arrangement of the at least one UI element in relation to the background image on the display screen.

10. The layout generation system as claimed in claim 9, wherein upon identifying the one or more operations, the processor is further configured to divide the display screen into the plurality of grids based on parameters associated with the at least one UI element.

11. The layout generation system as claimed in claim 10 wherein the parameters associated with the at least one UI element comprise size, transparency, and interactability with users.

12. The layout generation system as claimed in claim 9, wherein the processor is further configured to calculate the saliency score for each of the plurality of grids on the display screen and the aesthetic score for each of the plurality of grids on the display screen based on respective heatmap output of pre-trained machine learning models.

13. The layout generation system as claimed in claim 9, wherein the saliency score corresponds to prominent features in the display screen, the aesthetic score corresponds to a region with ideal placement possibilities and the interaction score corresponds to a region comprising locations with pre-determined accessibility threshold.

14. The layout generation system as claimed in claim 9, wherein the processor is further configured to determine the user interaction score based on pre-determined user behavior of usage of the electronic device.

15. The layout generation system as claimed in claim 9, wherein the processor is further configured to:

receive at least one of an input from the electronic device and a user input to trigger the re-arrangement of the at least one UI element in the electronic device;

determine locations of the plurality of candidate regions and of the optimal region;

identify current position of the at least one UI element in relation to the plurality of candidate regions and the optimal region; and move the at least one UI element away from the plurality of candidate regions.

16. The layout generation system as claimed in claim 9, wherein the processor is further configured to:

identify the at least one UI element currently being displayed on the electronic device, wherein the at least one UI element and an image content are being simultaneously displayed on the electronic device; and display the at least one UI element on the identified optimal region.

\* \* \* \* \*